US009970470B2

United States Patent
Shih

(10) Patent No.: US 9,970,470 B2
(45) Date of Patent: May 15, 2018

(54) FLOORING SCREW

(71) Applicant: BI-MIRTH CORP., Kaohsiung (TW)

(72) Inventor: Yi-Chieh Shih, Kaohsiung (TW)

(73) Assignee: BI-MIRTH CORP., Kaohsiung (TW)

( * ) Notice: Subject to any disclaimer, the term of this patent is extended or adjusted under 35 U.S.C. 154(b) by 174 days.

(21) Appl. No.: 15/016,642

(22) Filed: Feb. 5, 2016

(65) Prior Publication Data

US 2017/0227039 A1 Aug. 10, 2017

(51) Int. Cl.
*F16B 25/10* (2006.01)
*F16B 25/00* (2006.01)

(52) U.S. Cl.
CPC ...... *F16B 25/0015* (2013.01); *F16B 25/0063* (2013.01); *F16B 25/103* (2013.01)

(58) Field of Classification Search
CPC .............. F16B 25/0063; F16B 25/0047; F16B 25/0057; F16B 25/0015
USPC .............................................. 411/387.2, 412
See application file for complete search history.

(56) References Cited

U.S. PATENT DOCUMENTS

| 7,293,947 | B2 * | 11/2007 | Craven ................. F16B 35/048 |
| | | | 411/387.2 |
| 9,103,364 | B2 * | 8/2015 | Lin ...................... F16B 25/0057 |
| 2007/0059122 | A1 * | 3/2007 | Lin ....................... F16B 5/0275 |
| | | | 411/412 |

FOREIGN PATENT DOCUMENTS

TW  M383651 U  7/2010

* cited by examiner

*Primary Examiner* — Gary W Estremsky
(74) *Attorney, Agent, or Firm* — Muncy, Geissler, Olds & Lowe, P.C.

(57) ABSTRACT

A flooring screw comprises a screw head, a screw shank connected with the screw head, and a cone connected with screw shank. The screw shank includes a first shank section connected with the screw head, a second shank section connected with the cone, a first thread formed on the first shank section, a second thread extended from the cone to the second shank section and running helically along a direction opposite the direction of the first thread, and a third shank section between the first shank section and the second shank section. The third shank section includes a plurality of peaks protruding outward radially and a plurality of troughs formed between the peaks and recessed radially with respect to the peaks. The peaks and the troughs form an unsmooth surface on the third shank section.

7 Claims, 9 Drawing Sheets

FLOORING SCREW

FIELD OF THE INVENTION

The present invention relates to a flooring screw, particularly to a flooring screw used to join two workpieces together and able to enhance the fixing security thereof.

BACKGROUND OF THE INVENTION

A Taiwan patent No. M383651 disclosed a screw, which comprises a head and a shank extended from one side of the head and having a drill bit at the free end thereof. The shank includes a first thread neighboring the head and a second thread neighboring the drill bit. A non-threaded section is formed between the first thread and the second thread. The pitch of the first thread is smaller than the pitch of the second thread. Each circle of the second thread includes a plurality of breaking teeth for debris removal. The drill bit includes two cutting edges with the included angle therebetween being an acute angle. The conventional screw can fix a plurality of boards together and can decease the screwing stress lest the boards crack.

The non-threaded section of the conventional screw is free of threads and lacks sufficient force to bite the boards tight. Thus, the screwed boards may be joined insecurely and shake. Besides, the like screws have a smooth and round surface, which may make the operator unable to hold it stably or position it precisely and thus result in inaccurate screwing. Therefore, the conventional technology still has room to improve.

SUMMARY OF THE INVENTION

One objective of the present invention is to solve the problems of insufficient biting force and insecure fixing of the conventional flooring screw used to join two boards together.

To achieve the abovementioned objective, the present invention proposes a flooring screw, which comprises a screw head, a screw shank connected with the screw head, and a cone connected with screw shank. The screw shank includes a first shank section connected with the screw head, a second shank section connected with the cone, a first thread formed on the first shank section, a second thread extended from the cone to the second shank section and running helically along a direction opposite the direction of the first thread, and a third shank section between the first shank section and the second shank section. The present invention is characterized in that the third shank section includes a plurality of peaks protruding outward radially and a plurality of troughs formed between the peaks and recessed radially with respect to the peaks and that the peaks and the troughs form an unsmooth surface on the third shank section.

In one embodiment, each peak is in form of a pyramid, and each trough is a groove among the peaks; the distance between two neighboring peaks is smaller than the pitch of the first thread or the second thread; the peaks are arranged into rows surrounding the third shank section and two neighboring rows of peaks are arranged in a staggered way.

In one embodiment, the third shank section is a polygonal-shape rod; each peak is a corner of a polygonal, and each trough is a side of the polygonal; the level of the peak is between the level of the second shank section and the level of the second thread; the diameter of the third shank section is slightly greater than the diameter of the first shank section.

In one embodiment, the flooring screw further comprises a debris exhaust groove recessed from the surface of the screw shank; the debris exhaust groove includes a start tip at the cone and a termination tip at the second shank section.

In one embodiment, the flank angle between the screw shank and each of the first thread and the second thread is within 45-55 degrees; the flank angles are asymmetric at the region neighboring the screw head and the region neighboring the cone.

In one embodiment, tapered sections are respectively formed on the interface between the third shank section and the first shank section and on the interface between the third shank section and the second shank section; the width of the tapered sections gradually shrink toward the third shank section.

In comparison with the conventional technology, the present invention has the advantages:

The peaks and troughs of the third shank section form an unsmooth surface, which increases the fixing security between the flooring screw and the side wall of the screwed hole generated by the flooring screw in joining two workpieces together, and which also provides channels for debris exhaust, and which also increases the stability of holding the flooring screw and promotes the precision of screwing operation.

DETAILED DESCRIPTION OF THE PREFERRED EMBODIMENTS

Figure 1:
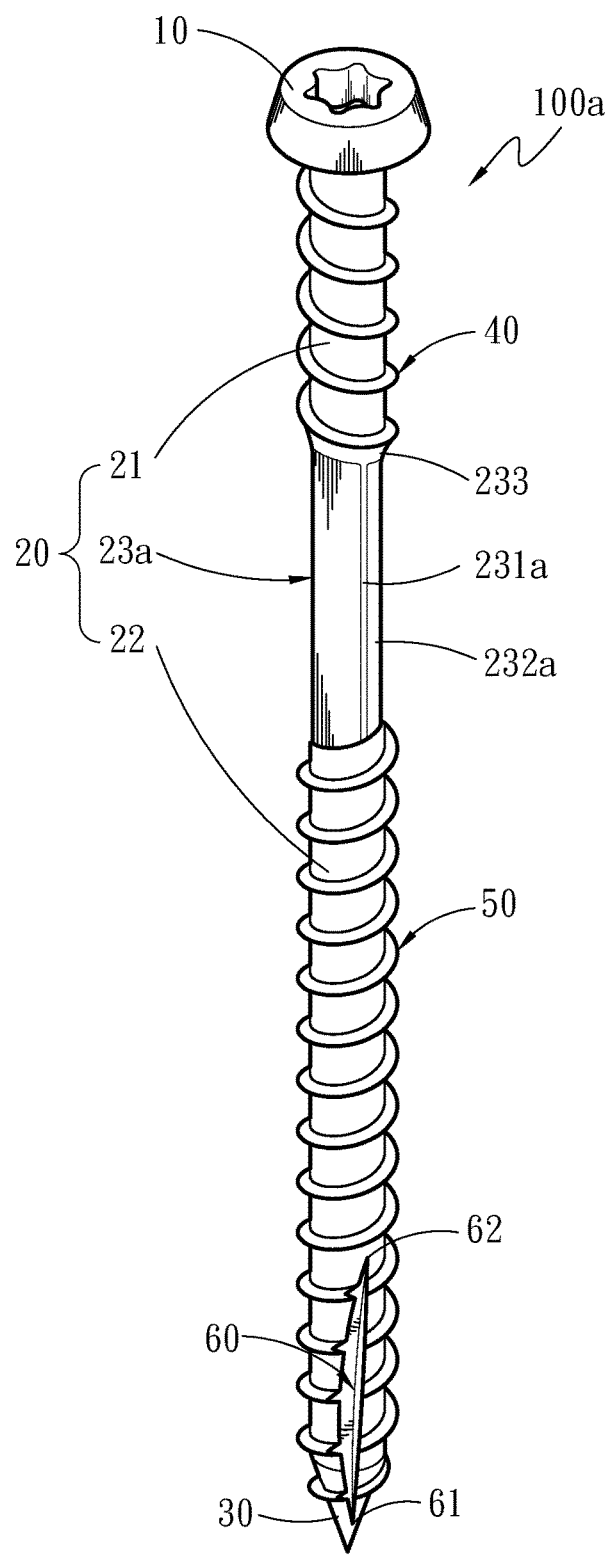
FIG. 1 is a perspective view schematically showing a flooring screw according to a first embodiment of the present invention.

Refer to FIG. 1 for a first embodiment of the present invention. In the first embodiment, the present invention provides a flooring screw 100a, which comprises a screw head 10, a screw shank 20 connected with the screw head 10, and a cone 30 connected with screw shank 20. The flooring screw 100 of the present invention is used to fix two boards together, such as plastic floor panels, wooden floor panels, or other boards having different hardnesses and different elastic moduli.

Figures 2A, 2B:
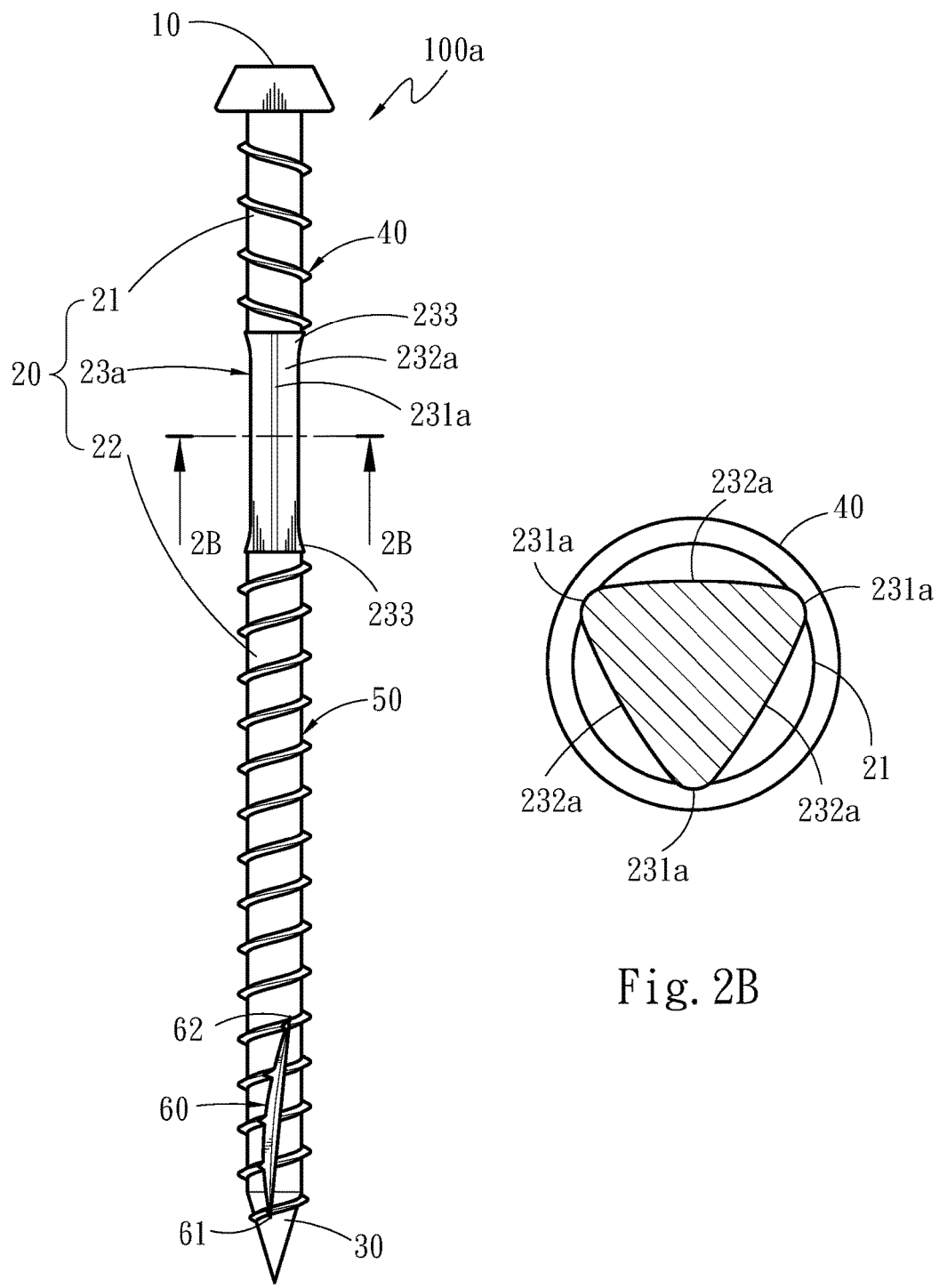
FIG. 2A is a plan view schematically showing the flooring screw according to the first embodiment of the present invention.
FIG. 2B is a sectional view taken along Line 2B-2B in FIG. 2A.

Refer to FIG. 2A and FIG. 2B. The screw shank 20 includes a first shank section 21 connected with the screw head 10, a second shank section 22 connected with the cone 30, a first thread 40 formed on the first shank section 21, a second thread 50 extended from the cone 30 to the second shank section 22 and running helically along a direction opposite the direction of the first thread 40, and a third shank section 23a between the first shank section 21 and the second shank section 22. The third shank section 23a is free of threads. In an overall view, the two ends of the flooring screw 100 respectively have threads running along different directions with the middle section non-threaded. The third shank section 23a includes a plurality of peaks 231a protruding outward radially and a plurality of troughs 232a formed between the peaks 231a and recessed radially with respect to the peaks 231a. The peaks 231a and the troughs 232a form an unsmooth surface on the third shank section 23a. In a first embodiment, the third shank section 23a is a polygonal-shape rod, wherein the peaks 231a form the corners of the polygonal shape and the troughs 232a form the sides of the polygonal shape, as shown in FIG. 1, FIG. 2A, and FIG. 2B. Thereby, the friction between the third shank section 23a and the debris is increased, and the fixing security of the flooring screw 100a to the boards is enhanced. The third shank section 23a can also increase the holding security of the user to the flooring screw 100a lest the flooring screw 100a be dropped down from the hand or positioned unstably in operation.

The top of the peak 231a is preferably between the levels of the second shank section 22 and the second thread 50. The diameter of the third shank section 23a is preferably slightly greater than the diameter of the first shank section 21. Thereby, the peaks 231a compress the side wall of the screwed hole and slightly expand the hole to make the screwing action smooth and make the debris move to the first shank section 21 and fast exhausted from the screwed hole. Tapered sections 233 are respectively formed on the interface between the third shank section 23a and the first shank section 21 and on the interface between the third shank section 23a and the second shank section 22, and the width of the tapered section 233 gradually shrinks toward the third shank section 23a. The tapered section 233 provides a buffer space to make the debris exhausting speed vary gradually from the second shank section 22 to the third shank section 23a lest uneven debris moving speed causes too high a debris density in the border between the second shank section 22 and the third shank section 23a, which may further cause the fracture of material.

Figure 3:
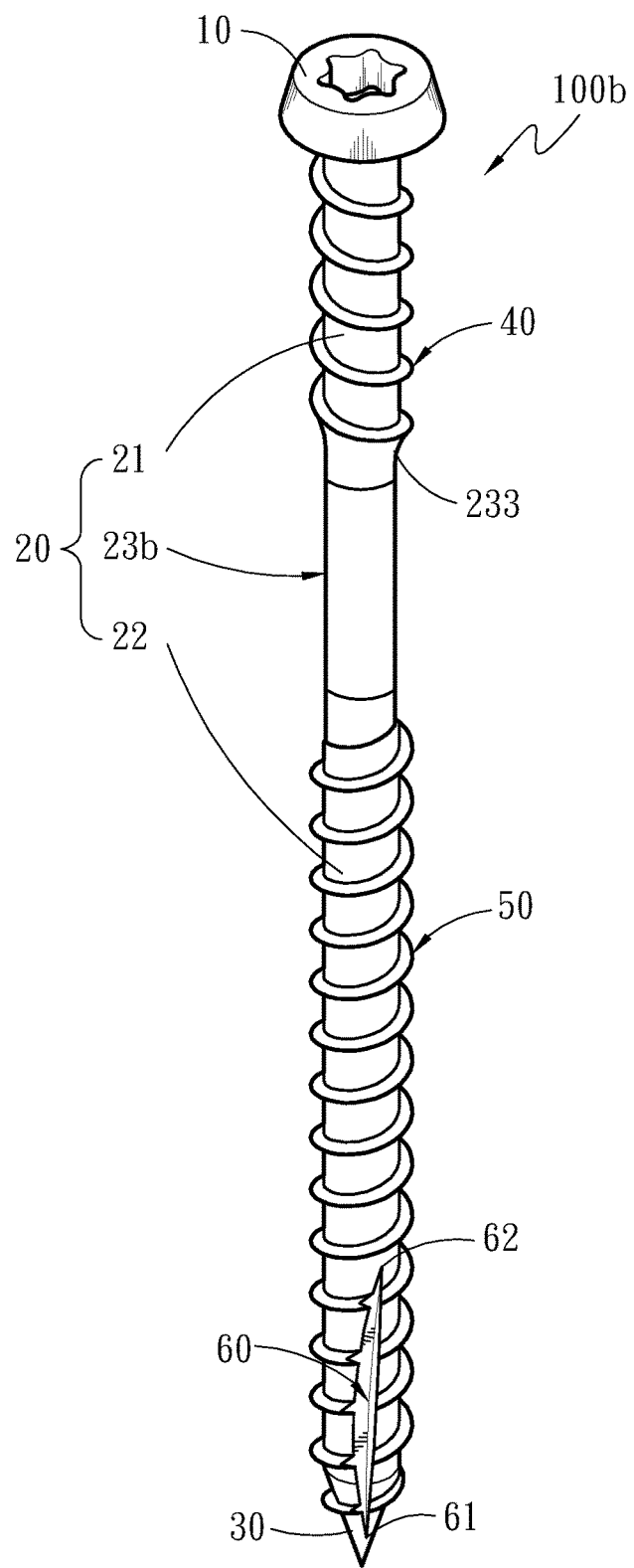
FIG. 3 is a perspective view schematically showing a flooring screw according to a second embodiment of the present invention.
Figures 4A, 4B:
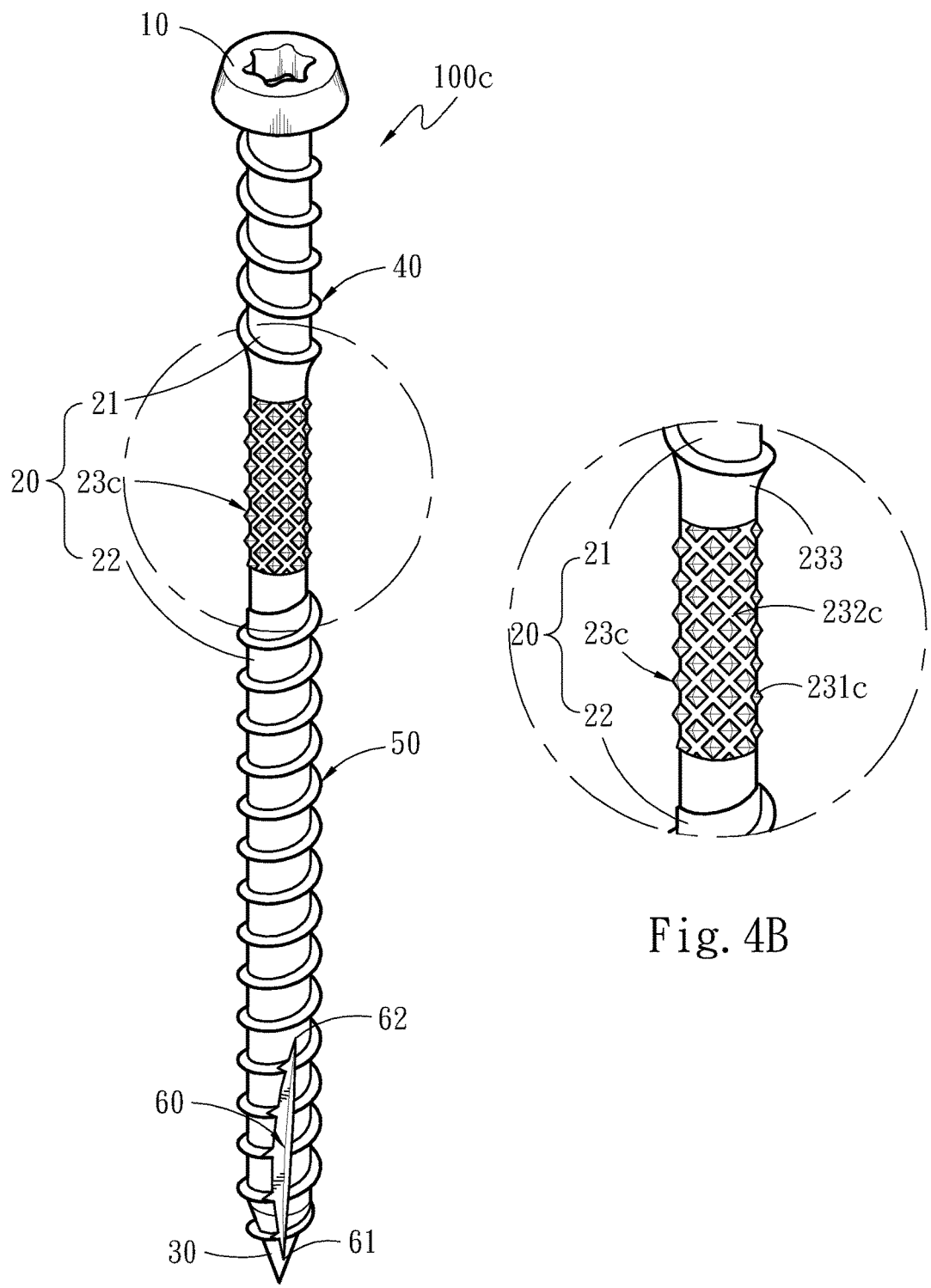
FIG. 4A is a perspective view schematically showing a flooring screw according to a third embodiment of the present invention.
FIG. 4B is a locally enlarged view of FIG. 4A.

Refer to FIG. 3 for a second embodiment of the present invention. In the second embodiment, the third shank section 23b of the flooring screw 100b is in form of a rod having an elliptic cross section. Refer to FIG. 4A and FIG. 4B for a third embodiment of the present invention. In the third embodiment, the third shank section 23c of the flooring screw 100c is in form of a round rod with the peaks 231c and the troughs 232c fabricated on the surface thereof. Each peak 231c is in form of a pyramid, and each trough 232c is a groove among the peaks 231c. The distance between two neighboring peaks 231c is smaller than the pitch of the first thread 40 or the second thread 50. The peaks 231c are arranged to form several rows surrounding the third shank section 23c; the neighboring rows of the peaks 231c are arranged in a staggered way to increase the friction as much as possible; the troughs 232c provide channels for exhausting debris to reduce debris blocking lest the boards be cracked during screwing operation. The abovementioned different embodiments can all increase the friction area between the debris and the screw and enhance the fixing security.

Figure 5A:
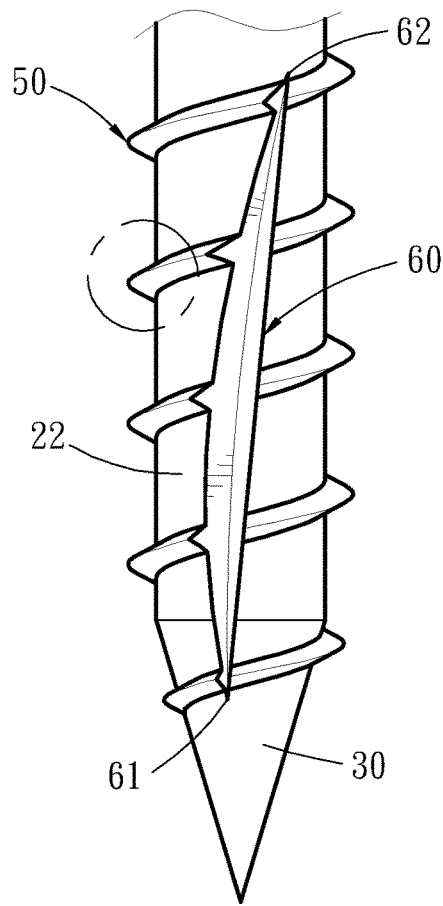
FIG. 5A is a diagram schematically showing a debris exhaust groove according to the third embodiment of the present invention.
Figure 5B:
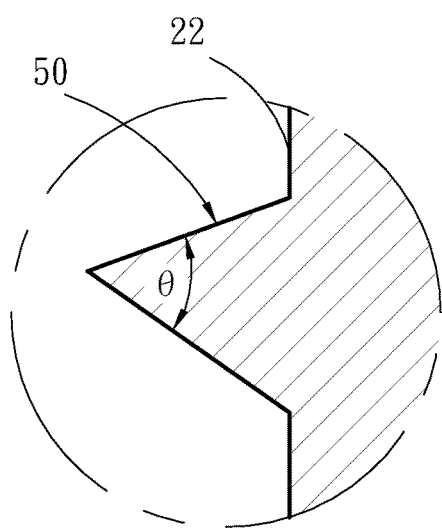
FIG. 5B is a sectional view locally enlarging a region in FIG. 5A.

Refer to FIG. 5A. In the third embodiment, the flooring screw 100c further comprises a debris exhaust groove 60 recessed from the surface of the screw shank 20. The debris exhaust groove 60 includes a start tip 61 at the cone 30 and a termination tip 62 at the second shank section 22. The debris exhaust groove 60 provides a channel to exhaust the debris out of the screwed hole during screwing operation. Refer to FIG. 5B. The flank angles θ of the first thread 40 and the second thread 50 are asymmetric at the area neighboring the screw head 10 and the area neighboring the cone 30. The flank angle θ is preferably within 45-55 degrees so that the flooring screw 100 can be screwed into the workpieces more easily. The flank angle θ also provides oblique support force to prevent the flooring screw 100 from loosening.

Figure 6A:
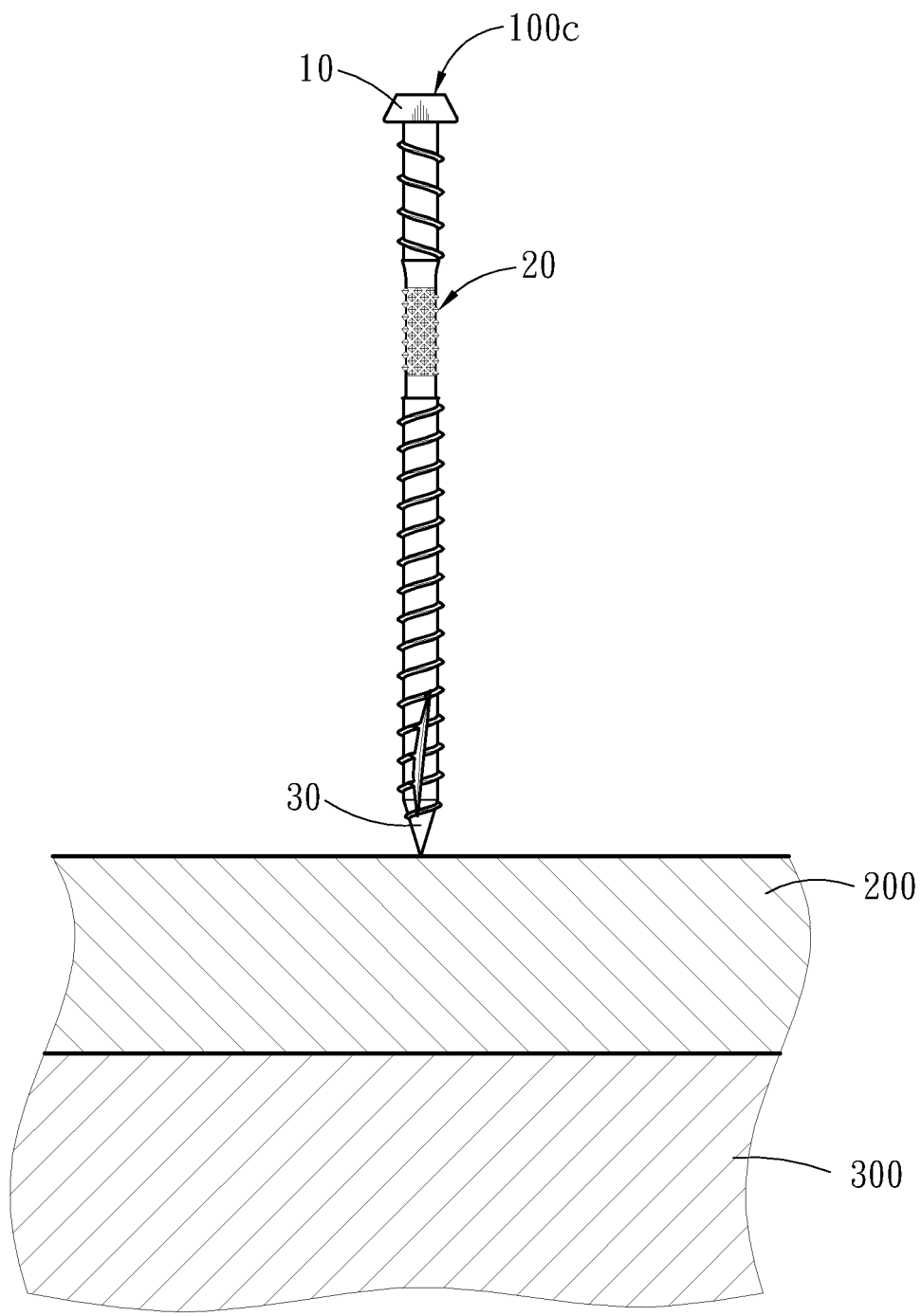
FIGS. 6A-6D are diagrams schematically showing the operation of the flooring screw according to the fourth embodiment of the present invention.
Figure 6B:
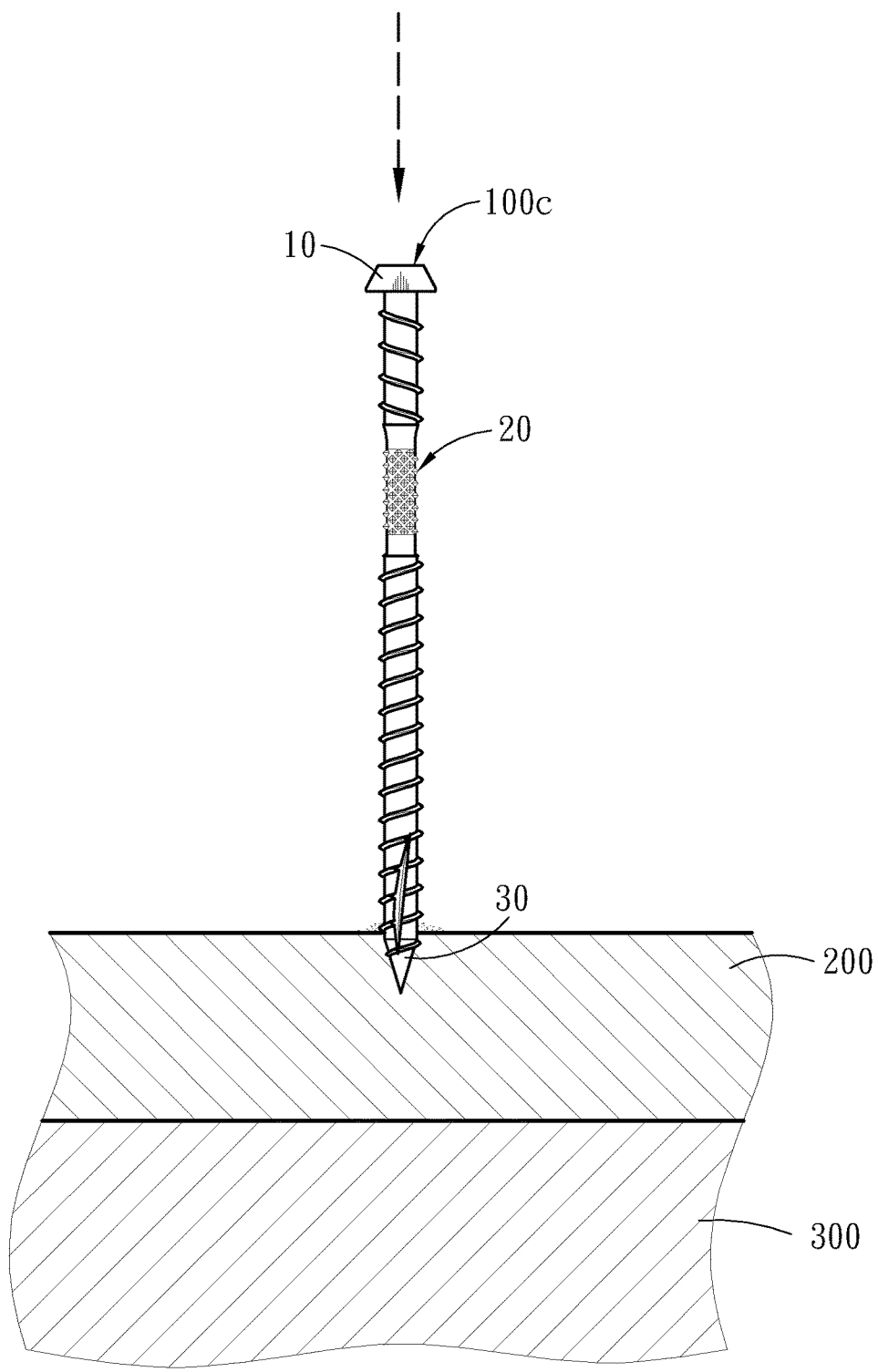
Figure 6C:
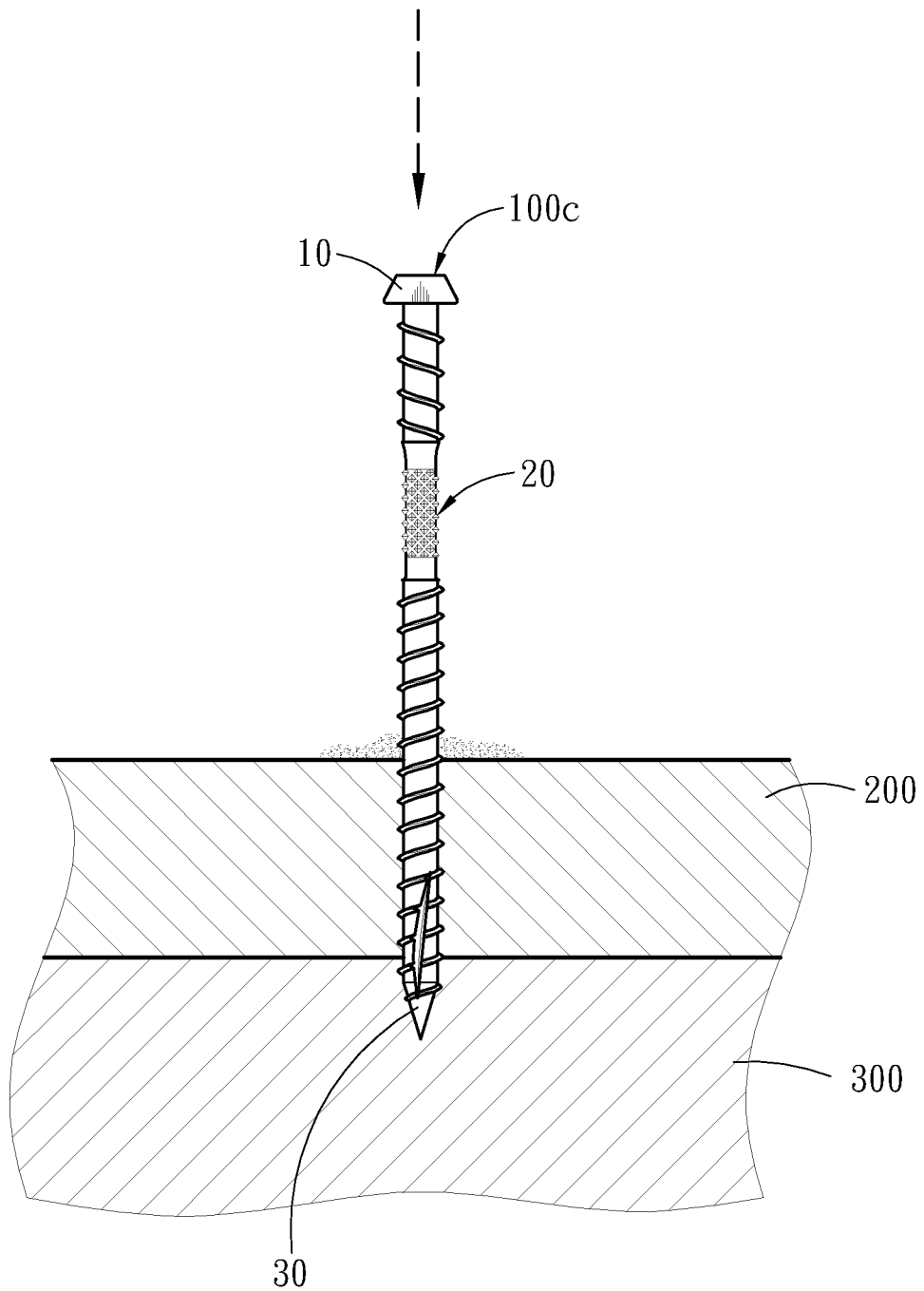
Figure 6D:
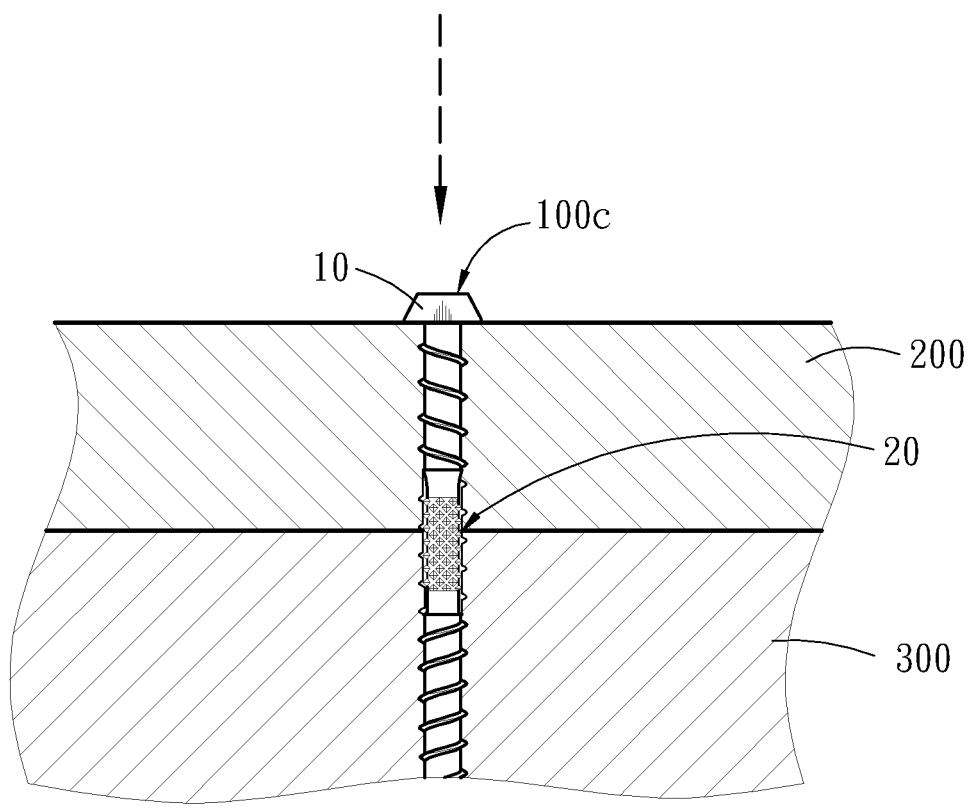

Below is described the usage of the flooring screw of the fourth embodiment of the present invention. Refer to FIG. 6A. Firstly, the user places a first workpiece 200 on a second workpiece 300, wherein the first workpiece 200 and the second workpiece 300 are boards respectively made of different materials, such as wood and plastic; then the user sticks the cone 30 of the flooring screw 100c into the top of the first workpiece 200. Refer to FIG. 6B. Next, the user uses a tool, such as a screw driver (not shown in the drawings), to operate the screw head 10 and drive the flooring screw 100c into the first workpiece 200. Refer to FIG. 6C. After the flooring screw 100c is screwed through the first workpiece 200, the user continues to drive the flooring screw 100c into the second workpiece 300. As mentioned above, the first thread 40 and the second thread 50 respectively run in opposite directions. While the flooring screw 100c is screwed through the first workpiece 200 and into the second workpiece 300, the second thread 50 cuts the screwed hole in an opposite direction, crushing the debris in the first workpiece 200, and exhausting the crushed debris through the channel generated in screwing lest the debris tangle inside the screwed hole and impair screwing. Refer to FIG. 6D. The screw head 10 finally contacts the top surface of the first workpiece 200, and the third shank section 23 reaches the interface between the first workpiece 200 and the second workpiece 300; meanwhile, the first thread 40 bites the second workpiece 300, and the second thread bites the first workpiece 200. Thus is completed the joint of the first workpiece 200 and the second workpiece 300.

In summary, the present invention is characterized in that the peaks and troughs of the third shank section form a unsmooth surface, which can provide debris exhaust channels while the flooring screw is screwed into two different types of workpieces, and which can increase the friction between the flooring screw and the side wall of the screwed hole and enhance the fixing security of the flooring screw and the workpieces. Besides, the unsmooth surface of the third shank section can also improve the stability of holding the flooring screw and promote the precision of screwing operation.

What is claimed is:

1. A flooring screw comprising a screw head, a screw shank connected with the screw head, and a cone connected with the screw shank, wherein the screw shank includes a first shank section connected with the screw head, a second shank section connected with the cone, a first thread formed on the first shank section, a second thread extended from the cone to the second shank section and running helically along a direction opposite the direction of the first thread, and a third shank section between the first shank section and the second shank section, and wherein the flooring screw is characterized in that:

the third shank section includes a plurality of peaks protruding outward radially and a plurality of troughs formed between the peaks and recessed radially with respect to the peaks, and the peaks and the troughs form an unsmooth surface on the third shank section;

wherein each peak is in form of a pyramid, and each trough is a groove among the peaks, and wherein a distance between two neighboring peaks is smaller than a pitch of the first thread or the second thread.

2. The flooring screw according to claim 1, wherein the peaks are arranged into rows surrounding the third shank section, and wherein two neighboring rows of peaks are arranged in a staggered way.

3. The flooring screw according to claim 1, wherein the level of the peak is between the level of the second shank section and the level of the second thread.

4. The flooring screw according to claim 1, wherein the diameter of the third shank section is slightly greater than the diameter of the first shank section.

5. The flooring screw according to claim 1 further comprising a debris exhaust groove recessed from the surface of the screw shank, and wherein the debris exhaust groove includes a start tip at the cone and a termination tip at the second shank section.

6. The flooring screw according to claim 1, wherein an flank angle between the screw shank and each of the first thread and the second thread is within 45-55 degrees, and the flank angles are asymmetric at the region neighboring the screw head and the region neighboring the cone.

7. The flooring screw according to claim 1, wherein tapered sections are respectively formed on the interface between the third shank section and the first shank section and on the interface between the third shank section and the second shank section, and the width of the tapered sections gradually shrink toward the third shank section.

* * * * *